July 1, 1958   J. A. SAXMAN   2,841,015
AUTOMATIC CAGING DEVICE FOR GUNSIGHT GYRO
Filed March 21, 1955

INVENTOR.
JAMES A. SAXMAN
BY
ATTYS.

United States Patent Office 2,841,015
Patented July 1, 1958

2,841,015

AUTOMATIC CAGING DEVICE FOR GUNSIGHT GYRO

James A. Saxman, Portland, Ind., assignor to the United States of America as represented by the Secretary of the Navy Application March 21, 1955, Serial No. 495,834

8 Claims. (Cl. 74—5.1)

(Granted under Title 35, U. S. Code (1952), sec. 266)

The invention described herein may be manufactured and used by or for the Government of the United States of America for governmental purposes without the payment of any royalties thereon or therefor.

This invention relates to caging devices for gyroscopes and more particularly to an automatic caging or antigyroscope tumbling device used in conjunction with the usual caging system of such gyroscopes to apply caging current to the gyroscope range or caging coils without interfering with the normal caging system.

It is usual practice to cage gyroscopes occasionally by manual control of an electrical circuit for energizing the range or cage coils of the gyroscope. Many of these systems were circuited through the gyroscope rotor and gimbal ring bearings which required these bearings and balls thereof to carry currents. Such circuitry is somewhat unreliable because of the relatively high resistances that could be built up across these bearings and the fact that it was possible to pit the bearings with this current.

In the present invention an electrical "pick-up ring" is positioned in close spaced relation with the mirror driven by the gyroscope which, when contacted by any portion of the mirror as a result of gyroscope tumbling, will complete a circuit to establish the energization of the ranging or caging coils of the gyroscope long enough to cause erection thereof. The "pick-up ring" consists of a flat ring with a pair of electrical conductors thereon which lie in a radial reversed turn pattern to permit electrical bridging by any peripheral portion of the driven mirror. The circuit is set up through an electronic switch which is controllable in time to vary the energization time of the range coils. Energization of the range coils may also be effected by manual switching without switching off the automatic means. It is therefore a general object of this invention to provide an automatic caging or erecting device for mirror driven gyroscopes which is rapid and accurate in erecting a tumbling gyroscope with the minimum of current through the gyroscope bearings and without affecting other erecting means.

Figure 1:
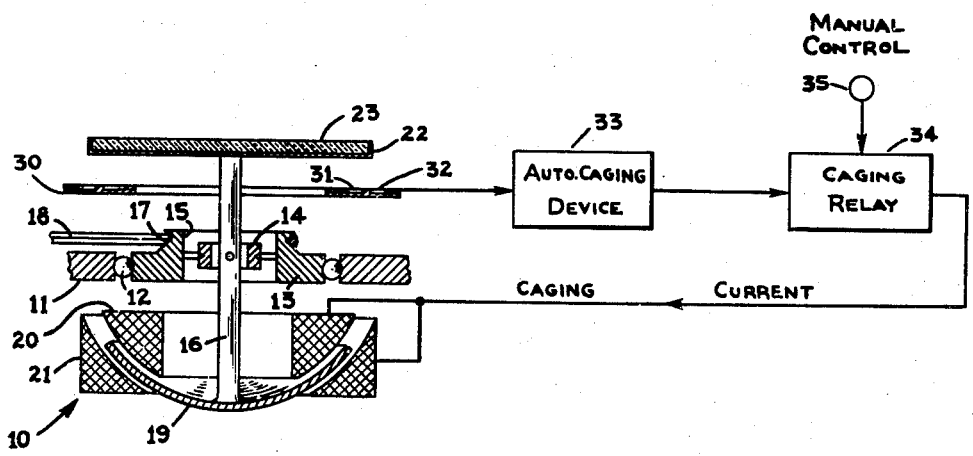
Figure 2:
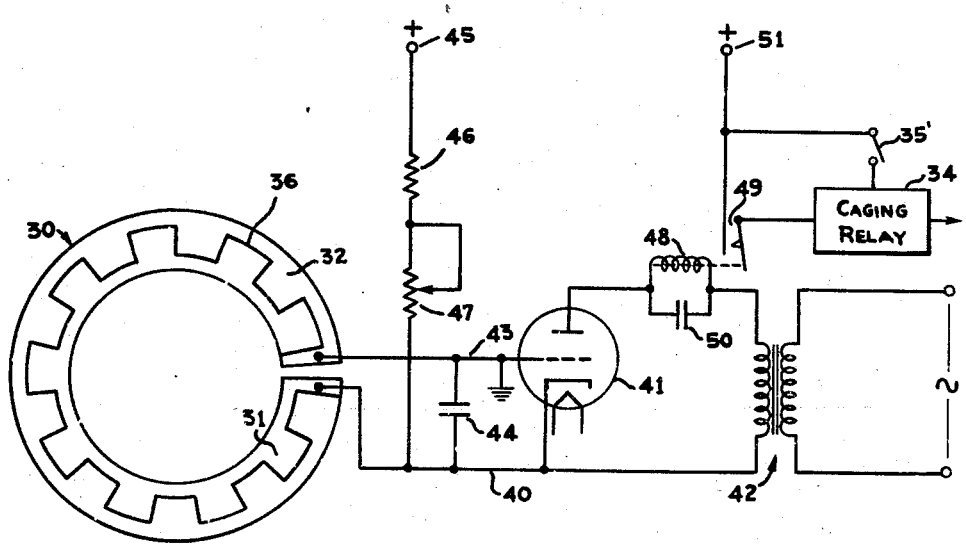

These and other objects, advantages, features, and uses will become more apparent when considered along with the accompanying drawing, in which:

Fig. 1 is a diagrammatic illustration, shown partly in block diagram, of this invention; and Fig. 2 is a circuit diagram of the caging and timing device of this invention.

Referring more particularly to Fig. 1, a mirror-driven gyroscope, generally referred to by the reference character 10, is mounted in a case (not shown) in actual practice. The rotor of the gyroscope is rotatively journaled in the case at the broken away case portion 11 by a frictionless-type bearing 12. To the inner race member 13 is pivotally attached a ring 14 in a central opening 15 on one axis and the rotor shaft 16 is pivotally connected to the ring 14 on an axis in the same plane and perpendicular to the first axis to permit universal movement of the shaft 16 with respect to the race member 13. The inner and outer race members, and the universal joint 14, 15, 16 are shown diagrammatically herein since they form no part of the invention specifically, it being understood that many refinements and precision is required in these parts in actual practice. The inner race member 13 has a pulley portion 17 therein over which is passed a belt 18 driven from the gyroscope motor (not shown) as is well understood in the art. On the lower end of the shaft 16 is a spherical section 19 having its center of curvature at the intersection of the axes of the universal joint 14, 15. A pair of annular range coils 20 and 21, having an airspace therebetween in which the spherical section or disc 19 rotates, is fixed in the gyroscope case. On the upper end of the shaft 16 is fixed a metallic mirror support disc 22 in which is fixed a mirror 23. Belt 18 driving the inner race member 13 drives the shaft 16 with the mirror 23 and spherical disc 19 thereon. The shaft has limited angular deviation from the intersection of the axes at the universal joint 14, 15, the intersection of the axes being at the center of gravity of the shaft 16, disc 19, and mirror and support disc 22, 23. Whenever deviations of the shaft 16 occur, the range coils 20 and 21 may be energized to erect the shaft 16, as is well understood in the gyroscope erection systems art.

In carrying out the present invention to automatically cage the gyroscope 10, an annular ring 30 having a pair of conductors 31 and 32 thereon is positioned under the mirror support disc 22 a distance at which it is intended to cause erection. The ring 30 will generally be referred to as the "pick-up ring" and the particular construction of the conductors thereon will be more fully described in referring to Fig. 2. The conductors of the pickup ring 30 are coupled, as functionally shown, to an automatic caging device 33. The device 30 controls a caging relay 34 which normally has a manual means 35 for initiating gyroscope caging. The caging relay 34 switches the caging current to the range coils 20 and 21 whenever erection is called for by contact on the pickup ring 30 or by the manual means 35.

Referring more particularly to Fig. 2, the pickup ring 30 has the two conductors 31 and 32 thereon with a narrow separation therebetween which, in actual practice, may be an electrical insulator strip 36 or an airspace. The conductors 31 and 32 are separated throughout the annular ring along radial reversed turns so that the metallic mirror support disc 22 is able to produce a connection between these conductors by the peripheral edge thereof. The conductors 31 and 32 may be produced by printed circuitry processes or by other means well recognized in the art. The conductor 31 is coupled by a conductor 40 to the cathode of a triode tube 41 and to one side of a secondary of a transformer 42. The conductor 32 is coupled by a conductor 43 to the grid of tube 41, the grid being grounded. Across the grid and cathode of the tube 41 is a capacitor 44. Also coupled to the cathode of tube 41 is a voltage source 45 through a fixed resistor 46 and a variable resistor 47. The voltage source is positive and may be of any desirable level, 28 volts having been found satisfactory for the operation of the device. The anode of the tube 41 is coupled to the other terminal of the transformer 42 secondary through the coil 48 of a relay switch 49. The coil 48 has a smoothing capacitor 50 in shunt thereto. The relay switch 49 is normally open and switches a voltage source to the range coils 20 and 21 as illustrated in Fig. 1. The voltage source 51 may be manually switched to the caging relay 34 by the switch 35'. The primary of the transformer 42 is coupled to a voltage source, as 110 volts alternating current for example.

In the operation of the device in which the gyroscope is in the environment of a gunsight gyroscope device for the purpose of illustration, the gyroscope is set into action by driving the shaft 16 at high speed, as is well understood in the gyroscope art. If the shaft 16 deviates from its erected condition sufficiently to bring the peripheral edge of the mirror support disc 22 momentarily into contact with the pickup ring 30, a connection will be made across conductors 31 and 32, and consequently across conductors 40 and 43, to discharge the capacitor 44. The bias across the tube 41 caused by the charge on the capacitor 44 cuts off conduction through the anode circuit thereof but the discharge of the capacitor 44 to zero allows the tube 41 to conduct causing the energization of the coil 48 in relay 49 to establish a caging current through the range coils 20 and 21. Energization of the range coils sets up lines of force across the spherical disc 19 producing eddy currents therein that will be equalized to re-erect the shaft 16 of gyroscope 10 as is well understood in the art. Since the tumbling of the gyroscope is irregular, the contact of the support disc 22 with the pickup ring 30 is very short in duration which causes an instantaneous discharge of capacitor 44. When the connection of conductors 31 and 32 is removed, the charge on the capacitor 44 begins to increase at a time rate determined by the variable resistor 47. In this manner the time duration of the caging current can be controlled by the variable resistor 47. The value of the resistor 46 limits the value of the low timing interval while the value of the resistors 46 and 47 limit the high value of the timing interval. The resistor 46 also functions as a current limiting resistor when a connection is made between conductors 31 and 32. When the capacitor 44 becomes sufficiently charged to cut off tube 41, the caging current to the range coils 20, 21 is interrupted by the caging relay caused by the opening of relay 49. The conduction of the tube 41 supplies half wave rectified direct current through the coil 48, the parallel coupled capacitor 50 acting as an anti-chatter current smoothing device for the relay. The transformer 42 may be of unity ratio and function as an isolation transformer to prevent shorting through the alternating current and direct current ground.

While the preferred embodiment has been shown and described to illustrate the invention, it is to be understood that many modifications and changes may be made in the constructional details without departing from the spirit and scope of the invention and I desire to be limited only by the scope of the appended claims.

I claim:

1. A switching and timing device for switching and timing an electrical circuit comprising, a ring having a pair of conductors on one face thereof in close side-by-side radial reversed-turn relation adapted to be bridged by conductive element in contact therewith, electric switching means coupled to said pair of conductors for switching an electrical circuit upon said pair of conductors being bridged electrically, and timing means coupled to said electric switching means for timing the duration of said switching means whereby the electrical circuit may be switched by bridging said conductors which switched condition will exist for a time duration determined by said timing means.

2. A switching and timing device as set forth in claim 1 wherein said electric switching means is an electronically controlled relay and said pair of conductors are coupled to control the conduction of said electronically controlled relay.

3. A switching and timing device as set forth in claim 2 wherein said timing means includes a capacitor coupled to said electronically controlled relay to cut said electronically controlled relay off in the charged condition thereof and to allow conduction of said electronically controlled relay in the discharged condition thereof, and a variable resistor coupled from a voltage source to said capacitor to vary the rate of charging said capacitor.

4. An automatic caging device for metallic mirror support disc-driven gyroscopes having caging coils comprising, conductor means spaced from the mirror support disc of said gyroscope for making contact when touched by any portion of said mirror support disc, electrical switching means coupled to said conductor means and associated with the caging coils of said gyroscope to energize said caging coils in one switched condition of said electrical switching means, and timing means coupled to said electrical switching means for timing the switched condition of said electrical switching means whereby the mirror support disc-driven gyroscope will be erected whenever said mirror support disc tilts sufficiently to contact said conductor means.

5. An automatic caging device as set forth in claim 4 wherein said conductor means is an annulus supporting a pair of electrical conductor surfaces on a face thereof isolated throughout a radial reversed-turn path around said annulus to permit said pair of electrical conductors to be bridged by a peripheral portion of said mirror support disc.

6. An automatic caging device as set forth in claim 5 wherein said electrical switching means is a relay means operative to control a caging relay controlling a current through said caging coils, and said timing means is coupled to said relay means.

7. An automatic caging device as set forth in claim 6 wherein said relay means is an electronic conduction means circuited through the electromagnetic actuator of a relay switch controlling said caging relay, said annulus conductors are coupled to said electronic conduction means to control the conduction thereof, and said timing means includes a capacitor across said electronic conduction means and a variable resistance coupled between said capacitor and a voltage source for controlling the charging rate on said capacitor.

8. An automatic caging device for gyroscopes having a mirror supporting disc and a caging disc on the rotor thereof with caging coils in close air-spaced relation to the caging disc, and a caging relay controlling the caging coils, the invention which comprises; a pickup ring adapted to be positioned in close spaced relation to said gyroscope mirror supporting disc and having a pair of electrical conductors on a face adjacent said mirror supporting disc and isolated throughout said ring over a radial reversed turn path; a triode tube, said pair of electrical conductors being coupled to the grid and cathode of said triode tube; a capacitor connected across said grid and cathode and a voltage source coupled to charge said capacitor through variable resistance means; and a relay switch having the actuator coil thereof coupled in the anode circuit of said triode tube with the caging relay adapted to be in the switched circuit thereof whereby the bridging of said pair of conductors on said pickup ring by a portion of said mirror supporting disc will cause discharge of said capacitor allowing conduction of said triode tube to actuate said relay switch for a time period determined by the charging rate of said capacitor.

References Cited in the file of this patent

UNITED STATES PATENTS

| 1,335,055 | Hedenstrom | Mar. 30, 1920 |
| 2,561,367 | Haskins | July 24, 1951 |
| 2,633,028 | Fillebrown | Mar. 31, 1953 |
| 2,720,116 | Furst | Oct. 11, 1955 |